United States Patent [19]
Zinke et al.

[11] Patent Number: 5,249,944
[45] Date of Patent: Oct. 5, 1993

[54] DEVICE TO COLLECT MOLTEN PLASTIC STRANDS WITH A DEVICE TO DISPLAY THE UNDISTURBED PASSAGE OF THE PLASTIC STRANDS

[75] Inventors: Klaus-Rudiger Zinke, Sulzbach; Jurgen Keilert, Kleinwallstadt; Frank Glockner, Aschaffenburg, all of Fed. Rep. of Germany

[73] Assignee: Automatik-Maschinenbau GmbH, Grossostheim, Fed. Rep. of Germany

[21] Appl. No.: 888,607

[22] Filed: May 27, 1992

[30] Foreign Application Priority Data

May 31, 1991 [DE] Fed. Rep. of Germany ....... 4117941

[51] Int. Cl.⁵ .................... B29C 47/88; B29C 47/92
[52] U.S. Cl. .................... 425/71; 264/40.1; 425/169; 425/170
[58] Field of Search ............ 264/40.1, 40.6; 425/71, 425/135, 136, 143, 144, 154, 169, 170, 173, 67, 68

[56] References Cited

U.S. PATENT DOCUMENTS

| | | | |
|---|---|---|---|
| 3,618,168 | 11/1971 | Mukai et al. | 425/169 |
| 4,124,341 | 11/1978 | Locker | 425/136 |
| 4,180,539 | 12/1979 | Clarke | 264/143 |
| 4,528,157 | 7/1985 | Lettner et al. | 264/237 |

FOREIGN PATENT DOCUMENTS

| | | | |
|---|---|---|---|
| 0303166 | 2/1989 | European Pat. Off. | |
| 3205052C2 | 6/1983 | Fed. Rep. of Germany | |
| 3205052A1 | 8/1983 | Fed. Rep. of Germany | |
| 3615333A1 | 10/1986 | Fed. Rep. of Germany | |
| 3615333C2 | 10/1986 | Fed. Rep. of Germany | |
| 4117941C1 | 5/1991 | Fed. Rep. of Germany | |
| 2503891 | 10/1982 | France | 264/40.1 |
| 54-52165 | 4/1979 | Japan | 425/136 |

*Primary Examiner*—Scott Bushey
*Attorney, Agent, or Firm*—Banner, Birch, McKie & Beckett

[57] ABSTRACT

Device to collect and convey plastic strands, issuing from nozzles, on a discharge plate, over which cooling water flows, with a device to indicate the undisturbed passage of the plastic strands over the discharge plate or their accumulation on the discharge plate. At least one temperature-dependent electric resistor, which triggers a signal by way of a threshold value switch when the specified temperature is exceeded, is attached to a cooling water-free zone on the underside of the discharge plate in the region of impact of the plastic strands.

4 Claims, 2 Drawing Sheets

DEVICE TO COLLECT MOLTEN PLASTIC STRANDS WITH A DEVICE TO DISPLAY THE UNDISTURBED PASSAGE OF THE PLASTIC STRANDS

The invention relates to a device to collect and convey plastic strands, issuing from nozzles, on a discharge plate, over which cooling water flows, with a device to indicate the undisturbed passage of the plastic strands over the discharge plate or their accumulation on the discharge plate.

BACKGROUND OF THE INVENTION

In the case of such devices, the passage of the plastic strands can be disturbed, e.g., in that a strand contains an inhomogeneity of the plastic, which leads to the strand escaping sideways after issuing from the nozzle and, in so doing, sticking to one or more adjacent strands. Then, it cannot be ruled out that such a bonding of the plastic strands will not result in the sudden conglomeration of the plastic strands, which are then deposited as a chaotic pile on the discharge plate and, in so doing, interrupt the further passage of the plastic strands. Even though such cases rarely occur, there is still the need to signal immediately such trouble, in order to turn off quickly, e.g. the device concerned. To this end, light barriers, which are interrupted by such accumulations of plastic strands and thus trigger the desired signal, have been used directly above the discharge plate. Since at this stage during the operation of such devices vapors are often produced, an interruption was simulated in this manner for such light barriers, so that when such vapors occurred, false alarms were triggered. To eliminate this problem, mechanically acting indicators have been used with which the aforementioned accumulations were detected. These mechanical devices comprise a pivotable flap, which is disposed above the discharge plate and which is arranged in such a manner that during normal service the strands can run off unimpeded below the flap. If, however, an accumulation does form on the discharge plate, during its formation the accumulation displaces the flap out of its normal position, a procedure that is exploited to generate the desired signal. However, it has been demonstrated that the contact between flap and the still molten plastic strands forming the accumulation led to coalescing with the flap, resulting in the flap having to be cleaned after the completed deflection, a procedure that was very difficult to accomplish due to the sensitivity of the flap, since, in so doing, one had to avoid damaging the sensitive bearing of the flap.

SUMMARY OF THE INVENTION

The invention is based on the problem of designing the aforementioned device in such a manner that it can function with high reliability and cannot be damaged by the aforementioned accumulation of plastic strands. This problem is solved by the invention in that at least one temperature-dependent electric resistor (measuring resistor), which triggers a signal by means of a threshold value switch when the specified temperature is exceeded, is attached to a cooling water-free zone on the underside of the discharge plate in the region of impact of the plastic strands.

The invention utilizes the knowledge that an accumulation of molten plastic strands on the discharge plate at the place under discussion significantly impedes or even interrupts the stream of cooling water, so that the heat intrinsic in the molten plastic strands can no longer be dissipated by the cooling water. Therefore, the discharge plate heats up relatively fast (within a few seconds) at the spot concerned, a state that carries over to the temperature-dependent measuring resistor attached in the impact region of the plastic strands. This measuring resistor is attached to the underside of the discharge plate, thus on the side of the plastic plate of the discharge plate that faces away from the one possible accumulation and can, therefore, not be damaged by the plastic strands. In particular, it cannot be damaged when an accumulation, which has stuck perhaps to the discharge plate, is being removed. Since, it is additionally attached to a place which is maintained free of cooling water, this water does not affect the temperature of the measuring resistor, i.e. the temperature of the measuring resistor follows directly the sudden heating up of the discharge plate. This heating of the measuring resistor that is generated on account of the aforementioned accumulation is then exploited to trigger a signal, which can be indicated, e.g. acoustically or optically and, in addition, may be used optionally to switch off immediately the device concerned.

Depending on the composition of the plastic concerned, the processing of the plastic strands results in different temperatures, e.g. also of the cooling water, so that the threshold value switch, which indicates the sudden temperature increase in the measuring resistor, can be set accordingly. To make this requisite adjustment of the device to the plastic to be processed, the device can be designed expediently in such a manner that, besides at least one measuring resistor, a temperature-dependent resistor is attached as a compensating resistor to the discharge plate in a region outside of which the plastic strands strike, whereby measuring resistor and compensating resistor are included in a bridge circuit, in whose bridge arm is the threshold value switch in order to indicate a specific temperature difference between the measuring resistor and the compensating resistor.

The result of the arrangement of the measuring resistor and the compensating resistor within an electric bridge circuit is an automatic adjustment to the respective circumstance, since the temperature difference between measuring resistor and compensating resistor is indicated in the bridge circuit. Namely the compensating resistor delivers a kind of reference value for measuring the temperature, since it is attached in a region outside of the impact of the plastic strands and, therefore, absorbs the temperature of the discharge plate during normal operation, which corresponds largely to the temperature of the cooling water. The temperature of the cooling water orients itself to the plastic material to be processed.

Furthermore, the device can be designed more reliably in that an electric filter, in particular a resistance-capacitance (RC) element precedes the threshold value switch that limits the response of the threshold value switch to the rapid voltage changes transferred from the filter. If, e.g., due to persistent operation owing to especially anticipated cooling of the cooling water, a significant temperature differential between the measuring resistor and the compensating resistor or a temperature increase of great importance occurs only at the measuring resistor, such a change is suppressed by the filter and does not show at all at the threshold value switch. If, however, the formation of an accumulation of molten plastic strands on the discharge plate results in a sudden temperature increase at the site in question, this relatively rapid temperature increase or temperature difference is transferred from the filter and can, therefore, trigger the threshold value switch.

Since the above described devices usually process a plurality of plastic strands running off side by side, a plurality of measuring resistors and optionally compensating resistors are connected in series expediently over the width of the discharge plate. In this manner the goal is attained that measurements of whether plastic strands are suddenly piling up at any one place on the discharge plate are conducted continuously over the width of the discharge plate.

BRIEF DESCRIPTION OF THE DRAWINGS

The figures show embodiments of the invention.

DESCRIPTION OF THE PREFERRED EMBODIMENTS

Figure 1:
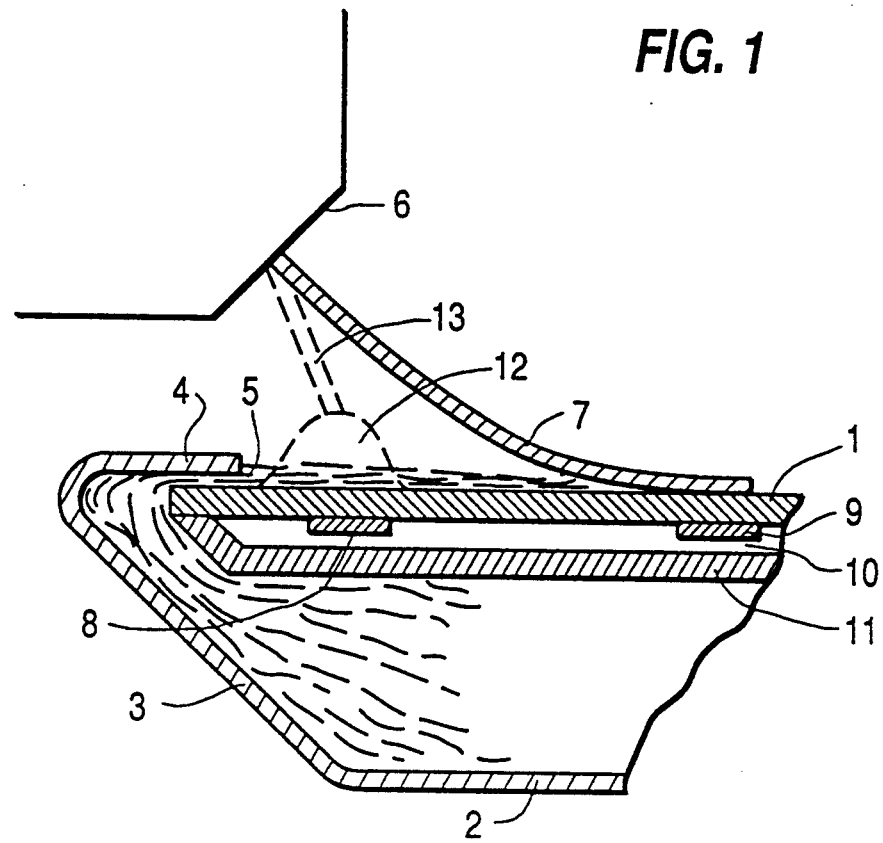
FIG. 1 is a cross sectional view, as seen from the side, of the discharge plate disposed below the set of nozzles, with a supply of water, a measuring resistor, and a compensating resistor.

The drawing in FIG. 1 starts from a device to collect and convey molten plastic strands, issuing from nozzles, as described and illustrated in the DE-PS-32 05 052 (U.S. Pat. No. 4,528,157). This device includes the discharge plate 1, which terminates a radiator tank 2, supplied with cooling water, on its upper side. The left side of the radiator tank 2 passes over into a metal guide plate 3, which is directed upwardly at an inclined angle and which passes over above the discharge plate 1 into the cover plate 4, which leaves open the slot 5 relative to the discharge plate 1. The cooling water, led into the radiator tank 2, flows out through this slot 5 and flows over the discharge plate 1, thus dragging along the plastic strands 7 issuing from the set of nozzles 6. For the sake of simplicity, only one single plastic strand is shown here. Normally there are a plurality of plastic strands arranged side by side, e.g., 60. Correspondingly the set of nozzles 6 contains a suitable number of individual nozzles.

The measuring resistor 8 and the compensating resistor 9 are cemented to the discharge plate 1 underneath it, so that these resistors also absorb the temperature of the region concerned of the discharge plate 1. Depending on the kind of resistor used, it can be attached in a different manner to the discharge plate 1, whereby one must pay attention to whether there exists a direct heat transfer from the discharge plate 1 to the resistor 8 or 9 in question. So that the resistors 8 and 9 are not influenced by the cooling water flowing into the radiator tank 2, a cooling water free zone 10 is formed below the discharge plate 1, and in particular by means of the cover 11, which is welded to the discharge plate 1 on the side of the rim and which seals the zone 10 relative to the radiator tank 2. In this manner the cooling water in the radiator tank 2 is kept away from the resistors 8 and 9.

The resistors 8 and 9 shown in FIG. 1 can also be embedded into the discharge plate 1, to which end said discharge plate is provided with suitable grooves. This has the advantage that in this case an especially intimate heat contact is generated between the discharge plate 1 and the resistors 8 and 9 concerned.

In the region of the measuring resistor 8, an accumulation 12 of a plastic strand is shown on the discharge plate 1, where the plastic strand concerned is indicated by the dashed-dotted line 13. This accumulation leads immediately during its formation to a rapid temperature increase in the region concerned of the discharge plate 1, which is communicated to the measuring resistor 8 and leads to the signaling of the presence of such an accumulation 12 by means of the electric circuit shown with respect to FIGS. 3 and 4.

Figure 2:
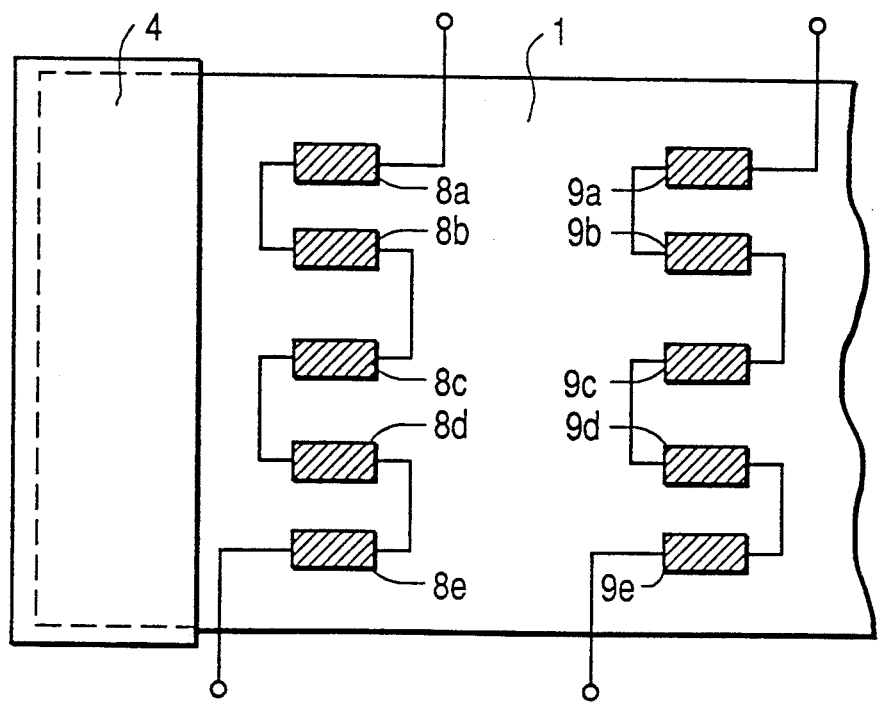
FIG. 2 is a top view of the discharge plate with several measuring resistors and several compensating resistors connected in series.

Since, as explained above, such devices are usually intended to collect a plurality of strands 7, the resistors in question are arranged expediently over the entire width of the discharge plate 1. This is shown in FIG. 2, which shows merely the discharge plate 1 and the cover plate 4. For the sake of a better overview of the drawing, the set of nozzles 6 are omitted in FIG. 2. Furthermore, several measuring resistors 8a to 8e and compensating resistors 9a to 9e are shown in the drawing of the electric circuits. The measuring resistors 8a to 8e and the compensating resistors 9a to 9e are connected in series. If a sudden temperature increase occurs at one or more of the measuring resistors 8a to 8e, this can be indicated immediately by means of the circuits shown in FIGS. 3 and 4. The entire width of the discharge plate 1 is monitored with respect to the formation of accumulations by means of the distribution of several measuring resistors 8a to 8e and the compensating resistors 9a to 9e.

Figure 3:
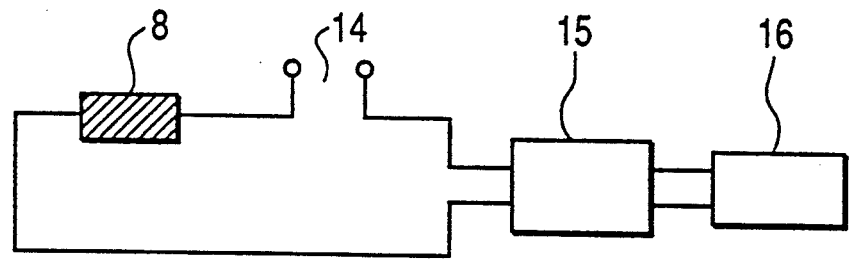
FIG. 3 is a circuit with a measuring resistor.

FIG. 3 shows a circuit, which is equipped merely with one or more measuring resistors 8, depending on how many measuring resistors 8 are distributed over the width of the discharge plate 1 concerned. The measuring resistor is supplied by a voltage source 14 with current, which flows not only over the measuring resistor 8 but also over the threshold value switch 15 and triggers said threshold value switch when a specific voltage is exceeded at the threshold value switch 15. Thus the threshold value switch activates the signal generator 16, which is attached to the threshold value switch and which brings about, e.g. the switching off of the device. If the circuit shown in FIG. 3 is used, the construction according to FIG. 1 has, of course, only the measuring resistor 8.

Figure 4:
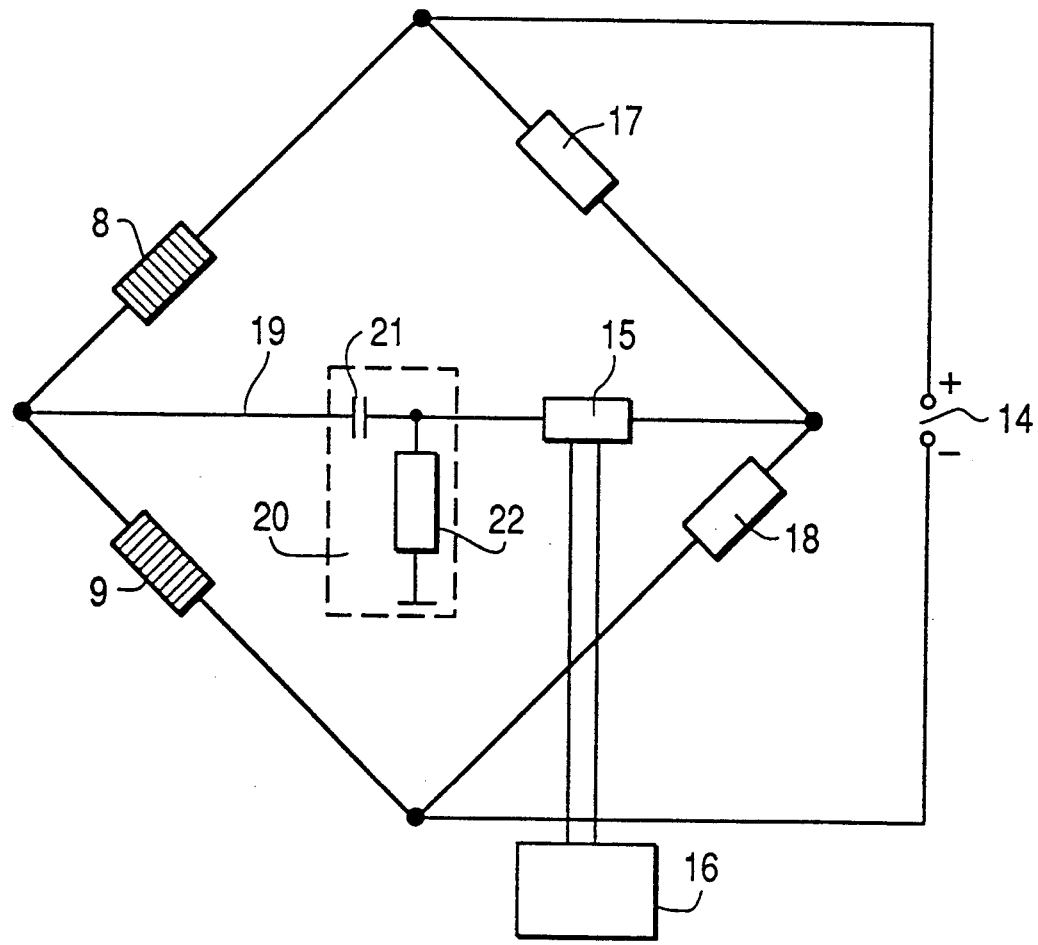
FIG. 4 is a bridge circuit with a measuring resistor and a compensating resistor.

The circuit shown in FIG. 4 is a bridge circuit with the measuring resistor 8 and the compensating resistor 9 and the two permanent bridge resistors 17 and 18. The threshold value switch 15, which activates the signal generator 16 in the circuit according to FIG. 3, is put into the bridge arm 19 of the bridge circuit. If in the circuit according to FIG. 4 a specific temperature difference occurs between the measuring resistor 8 and the compensating resistor 9, this temperature difference leads according to the action of the bridge circuit to a current in the bridge arm 19, resulting in the responding of the threshold value switch 15.

The filter circuit 20, enclosed by a dashed line, which is formed here by the RC element with the capacitor 21 and the resistor 22, is shown in the bridge arm 19. The time constant of this filter 20 is chosen in such a manner that relatively fast temperature changes at the measuring resistor 8 lead to an evaluatable pulse at the resistor 22, which then activates the threshold value switch 15. It involves here voltage changes, which occur in the range of a few seconds, which are then transferred correspondingly by the filter circuit 20. If, on the other hand, it involves temperature changes, resulting due to the influences extended over time, at the resistors 8 or 9, these temperature changes, which cannot also be traced to the sudden formation of an accumulation, are not transferred by the filter 20 and thus cannot lead to the triggering of a false alarm.

We claim:

1. An apparatus for collecting and conveying plastic strands (7) issuing from nozzles (6) onto an upper side of a discharge plate (1), said discharge plate having an underside opposite the upper side onto which the plastic strands impact, said upper side being contacted by cooling water, while the underside is free of water, and a device for indicating accumulation of plastic strands on the discharge plate or undisturbed passage of the strands over the discharge plate, said device including a measuring resistor (8) attached to said underside of the discharge plate for responding to the temperature of the adjacent portion of the discharge plate, and a threshold value switch (15) connected to said resistor for providing a signal when the temperature of said resistor exceeds a specified value.

2. Device, as claimed in claim 1, wherein
besides at least one measuring resistor (8), at least one compensating resistor (9) is attached to the discharge plate (1) in a region outside of which the plastic strands (7) strike, wherein the measuring resistor (8) and the compensating resistor (9) are included in a bridge circuit (8, 9, 17, 18, 19), having a bridge arm (19) including the threshold value switch (15) to indicate a specific temperature difference between measuring resistor (8) and compensating resistor (9).

3. Device, as claimed in claim 1, wherein
an electric filter (20) including a resistance-capacitance (RC) element (21, 22) precedes the threshold value switch (15) that limits the response of the threshold value switch (15) to rapid voltage changes transferred from the filter (20).

4. Device, as claimed in any of the claims 1 or 3, wherein
a plurality of measuring resistors (8a–e) and optionally compensating resistors (9a–e) are connected in series over the width of the discharge plate (1).

* * * * *